United States Patent
Bonnel et al.

(10) Patent No.: US 9,259,123 B2
(45) Date of Patent: Feb. 16, 2016

(54) ELECTROMECHANICAL REMOVABLE GRIP MECHANISM

(75) Inventors: Jocelyn Bonnel, Vions (FR); Michel Montgelard, Aix les Bains (FR); Jose Luis Herrada, Vienne (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/232,457

(22) PCT Filed: Jul. 5, 2012

(86) PCT No.: PCT/FR2012/051575
§ 371 (c)(1),
(2), (4) Date: Feb. 21, 2014

(87) PCT Pub. No.: WO2013/007927
PCT Pub. Date: Jan. 17, 2013

(65) Prior Publication Data
US 2014/0158701 A1 Jun. 12, 2014

(30) Foreign Application Priority Data

Jul. 13, 2011 (FR) ..................... 11 56378

(51) Int. Cl.
*B65D 25/28* (2006.01)
*A47J 45/07* (2006.01)
*A47J 45/10* (2006.01)

(52) U.S. Cl.
CPC ............... *A47J 45/071* (2013.01); *A47J 45/10* (2013.01); *B65D 25/282* (2013.01)

(58) Field of Classification Search
CPC ................................ A47J 45/071; A47J 45/10
USPC ................. 220/752, 759, 756, 762, 769, 771, 220/573.1, 573.2; 219/62, 438, 387, 627
See application file for complete search history.

(56) References Cited

U.S. PATENT DOCUMENTS

| 5,704,092 A | 1/1998 | Nicollet et al. |
| 7,337,712 B1 * | 3/2008 | Wang ...................... A47J 43/22 210/360.1 |
| 2006/0096996 A1 * | 5/2006 | Lorthioir et al. ............... 220/759 |
| 2006/0196057 A1 | 9/2006 | So |
| 2007/0277809 A1 * | 12/2007 | Little .................... A47J 37/105 126/369 |
| 2012/0000903 A1 * | 1/2012 | Baarman et al. ............... 219/620 |

FOREIGN PATENT DOCUMENTS

| DE | 102007054022 A1 | 5/2009 |
| EP | 0769263 A1 | 4/1997 |
| WO | 2007043000 A2 | 4/2007 |

* cited by examiner

Primary Examiner — Robert J Hicks
Assistant Examiner — Kareen Thomas
(74) Attorney, Agent, or Firm — The Webb Law Firm (57) ABSTRACT

Provided is a removable grip device (1) for a pot for cooking food, said removable grip device (1) comprising a grip body (7), attachment means that can be connected to the cooking pot and disconnected therefrom, and an electrical energy source (6). The removable grip device (1) comprises an electromechanical device fed by the energy source (6) and suitable for actuating a mechanical device, and control means for controlling the operation and the shut-off of the electromechanical device.

19 Claims, 11 Drawing Sheets

ELECTROMECHANICAL REMOVABLE GRIP MECHANISM

CROSS-REFERENCE TO RELATED APPLICATIONS

This application is the United States national phase of International Application No. PCT/FR2012/051575 filed Jul. 5, 2012, and claims priority to French Patent Application No. 1156378 filed Jul. 13, 2011, the disclosures of which are hereby incorporated in their entirety by reference.

FIELD OF THE INVENTION

This invention concerns a removable grip mechanism for a cooking pot.

Removable grip mechanisms or removable handles are used to grip cooking pots such as casseroles or frying pans. Removable grip mechanisms may be fixed temporarily to a cooking pot when in use and be removed from the cooking pot to make it easier to store.

DESCRIPTION OF THE RELATED ART

Document EP 0 769 263 which discloses a removable grip mechanism for a cooking pot which includes a side wall. The grip mechanism includes two bits which form a pincer which moves between an open and closed position in which the two bits which form a pincer grip the side wall of the cooking pot. The grip mechanism also includes movement means designed to move the bit which forms a pincer between the open and closed position. The movement means includes a lever mounted to pivot on a grip body between a removed and retracted position within the grip body. A blade which forms a connecting rod extends between the lever and the mobile bit and is designed to move the mobile bit in translation when the lever is pivoted manually by the user. To pivot the lever from the position away from the retracted position, the user must exert a relatively strong force on it. Further, to unlock the grip mechanism, the user must both push on the unlock button and not press on the lever to move it away. This maneuver is not easy for the user who must then use both hands to unlock the pot, one to push on the unlock button and the other to support the handle.

Further, such a removable handle of the prior art does not allow other functions to be provided, such as mixing vegetables, for example. To mix vegetables in a cooking pot, the user must use an additional utensil such as a mixer, which creates storage problems and is awkward when storing utensils.

SUMMARY OF THE INVENTION

Accordingly, the invention is designed to resolve these inconveniences and provide a removable grip mechanism which is easier to use, safer, multi-functional and resolves the bulkiness problem.

The invention concerns a removable grip mechanism for a cooking pot, wherein said removable grip mechanism includes a grip body, a mechanism to attach it to and disconnect it from the cooking pot, and an electrical energy source.

In accordance with the invention, the removable grip mechanism includes:

an electromechanical mechanism powered by the energy source designed to trigger (at least part of) a mechanical mechanism, and a command mechanism to control the operation of and stop the electromechanical mechanism.

Accordingly, the invention provides a removable grip mechanism which is easier to use and requires less effort to trigger the bit which forms a pincer. The pincer is opened and closed automatically. There is less play between the bit which forms a pincer and the side wall of the cooking pot. Therefore, safety is improved. The removable grip mechanism may also include additional functions, which are not possible with handles of the prior art, which assist in cooking. The multi-functionality of the removable grip mechanism allows a single cooking utensil to be used rather than multiple utensils, which reduces the storage space required for the utensils.

BRIEF DESCRIPTION OF THE DRAWINGS

Other characteristics and benefits of the invention emerge clearly from the description which is provided below for illustrative purposes and is by no means limited, with reference to attached diagrams, in which.

DESCRIPTION OF THE INVENTION

Removable grip mechanism 1 includes grip body 7, the mechanism to attach it to and disconnect it from cooking pot 24, and electrical energy source 6. Removable grip mechanism 1 includes electromechanical mechanism 5, 5a, 5b and 5c powered by energy source 6 to trigger a mechanical mechanism and command mechanism 4, 12, 22 and 56 to control the operation of and stop electromechanical mechanism 5, 5a, 5b and 5c.

The attachment mechanism may include pincer-type mobile bits which are activated manually or motorized as described below, for example. In one variation, the attachment mechanism may include hooks which are part of removable grip mechanism 1 which are designed to be inserted into one of the openings on side wall 25 of cooking pot 24. Other attachment mechanisms are also possible such as, for example, a nut-bolt system.

Preferably, the mechanical mechanism includes the attachment mechanism. Removable grip mechanism 1 includes trigger mechanism 3 driven by electromechanical mechanism 5, 5a, 5b and 5c designed to trigger the attachment mechanism.

The attachment mechanism may include two bits 2a and 2b which form a pincer wherein at least one of the bits moves relative to the other which is triggered by trigger mechanism 3. The attachment mechanism may be attached to side wall 25 of cooking pot 24 or to another section of the pot such as a bracket which is part of side wall 25.

Figure 1:
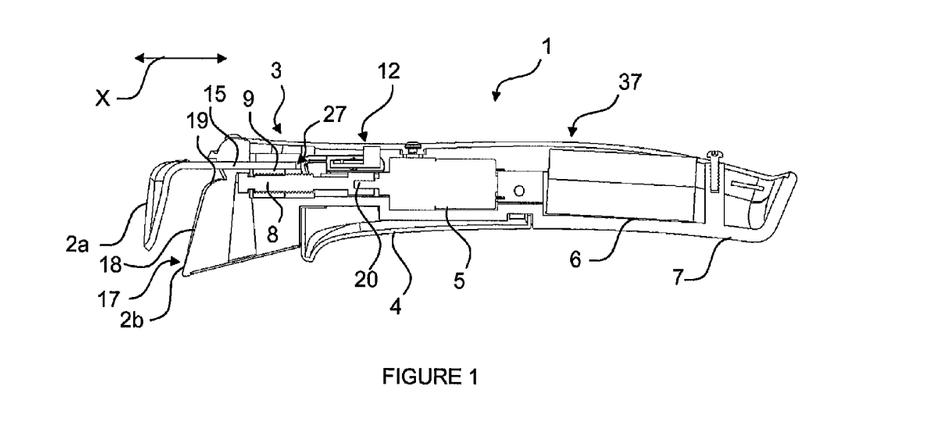
FIG. 1 shows a longitudinal cut-away of a removable grip mechanism, in accordance with one implementation of the invention, in the open position.

FIG. 1 shows a longitudinal cut-away of removable grip mechanism 1 in the open position, in one possible implementation.

In this implementation, the mechanical mechanism includes the attachment mechanism. The attachment mechanism includes two bits which form mobile pincer 2a and 2b which move in translation relative to one another between an open and closed position in which the two bits which form pincer 2a and 2b pinch side wall 25 of cooking pot or cooking pot 24. Removable grip mechanism 1 also includes trigger mechanism 3 to move at least one of the bits which form pincer 2a and 2b, electromechanical mechanism 5, 5a, 5b and 5c to control trigger mechanism 3, electrical energy source 6 to power electromechanical mechanism 5, 5a, 5b and 5c, and command mechanism 4, 12, 22 and 56 to control electromechanical mechanism 5, 5a, 5b and 5c.

Removable grip mechanism 1 includes grip body 7 which forms a handle in which trigger mechanism 3, electrical energy source 6 and command mechanism 4, 12, 22 and 56 are housed. Grip body 7 is elongated and extends in longitudinal direction (X).

The two bits which form pincer 2a and 2b are located on the front end of removable grip mechanism 1 and electrical energy source 6 is located near the rear extremity of removable grip mechanism 1. Command mechanism 4, 12, 22 and 56, electromechanical mechanism 5, 5a, 5b and 5c and trigger mechanism 3 are located between the two bits which form pincer 2a and 2b and electrical energy source 6. Other provisions are also possible. Electromechanical mechanism 5, 5a, 5b and 5c, trigger mechanism 3, the two bits which form pincer 2a and 2b and electrical energy source 6 are aligned basically along longitudinal direction (X), which creates a compact handle of sufficiently elongated shape to allow it to be gripped by a user to raise the cooking pot.

Figure 2:
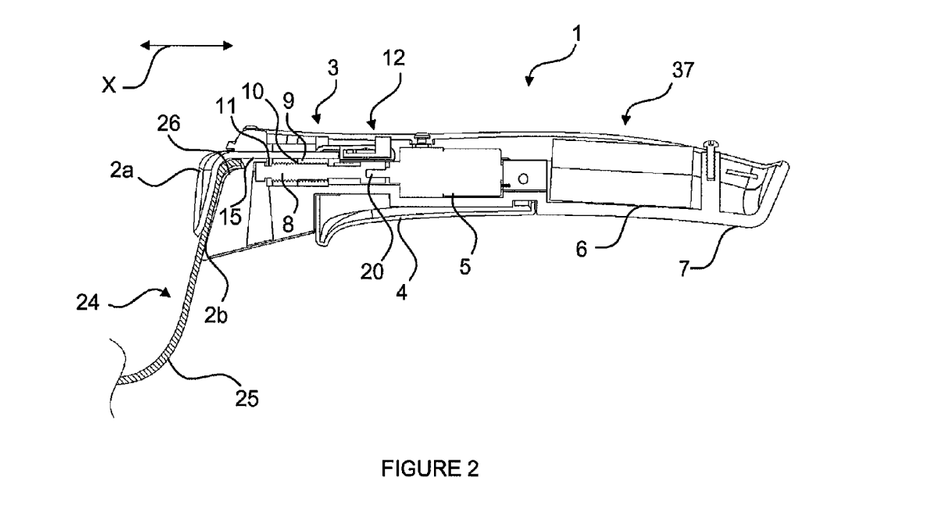
FIG. 2 shows a longitudinal cut-away of this removable grip mechanism in the closed position.
Figure 3:
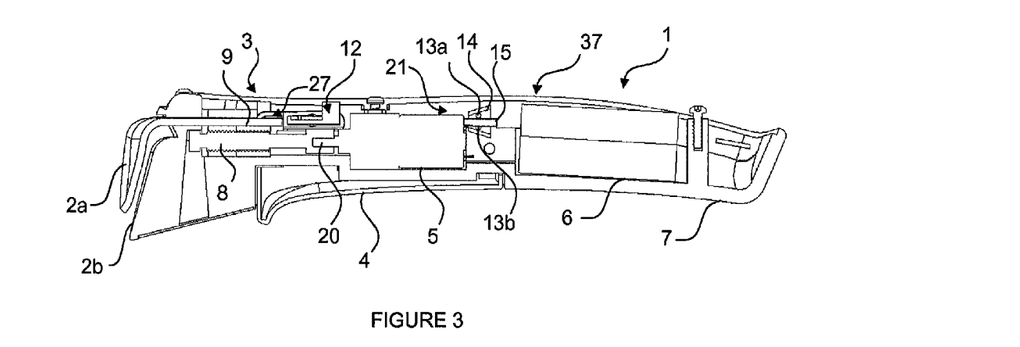
FIG. 3 shows a longitudinal cut-away of a removable grip mechanism which includes a mechanism to block the mobile bit.

In the examples in FIGS. 1 to 3, the attachment mechanism includes single mobile bit 2a which moves in translation relative to grip body 7 along longitudinal direction (X) and fixed bit 2b which is part of grip body 7. Mobile bit 2a is the bit which has an internal contact surface which is in contact with the internal surface of side wall 25 of pot 24. In one variation, the two bits which form pincer 2a and 2b may move in opposite directions along longitudinal direction (X).

The grip mechanism is designed to be attached to and disconnected from cooking pot 24, which is a cooking-type utensil (casserole, frying pan, casserole dish, etc.), which usually has a bottom and lateral wall 25 called a skirt. Side wall 25 may have curved edge 26 on its upper section which forms a pouring edge. The following examples are given for side wall 25 with edge 26 curved to the exterior. Fixed bit 2b is formed by grip body 7. More specifically, grip body 7 includes contact surface 17 which is designed to come into contact with the external surface of side wall 25 of pot 24. Front contact surface 17 has a shape which complements that of the external surface of side wall 25 and, more specifically, the external surface of curved edge 26 of cooking pot 24. More in particular, front contact surface 17 has section plate 18 extended by section 19 which is curved toward the interior of grip body 7. Grip body 7 is preferably made of bakelite. When removable grip mechanism 1 is set on cooking pot 24, cooking pot 24 is basically perpendicular to a plane tangent to side wall 25 of cooking pot 24. Mobile bit 2a has a shape which complements that of the internal surface of side wall 25 and, more specifically, the internal surface of curved edge 26 of cooking pot 24.

In one variation, the two bits which form pincer 2a and 2b of removable grip mechanism 1 may be attached to a right side wall without a curved edge.

Mobile bit 2a is extended by arm 15 which slides in slide 27 in grip body 7. Arm 15 extends in longitudinal direction (X). It is flat.

Electromechanical mechanism 5, 5a, 5b and 5c may include electrical motor 5, electromagnet 5a, servomotor 5c, pneumatic or electrical jack 5b, for example.

Preferably, electromechanical mechanism 5, 5a, 5b and 5c is electrical motor 5 powered by electrical energy source 6 which has shaft 20 which rotates, as shown in FIGS. 1 to 3. Still more preferably, electrical motor 5 includes a reduction gear. The rotation speed of electrical motor 5 is at least 340 rotations per minute and preferably 360 rotations per minute. The motor coupling should be at least 80 mN/m and preferably 100 mN/m.

Trigger mechanism 3 includes initial transmission mechanism 8 designed to transfer the rotation of electrical motor 5 to second transmission mechanism 9 which is part of mobile bit 2a to move mobile bit 2a between the open and closed positions.

In one possible variation, initial transmission mechanism 8 includes threaded rod 8 which is rotated by electrical motor 5.

Second transmission mechanism 9 includes mobile item 9 with a threaded opening which engages with threaded rod 8. The rotation of threaded rod 8 moves mobile item 9 in translation the length of it and, as a result, moves mobile bit 2a between the open and closed position. Threaded rod 8 may be an infinite screw. Threaded rod 8 is connected to shaft 20 of electrical motor 5. Threaded rod 8, shaft 20 and the bit which forms mobile pincer 2a and 2b are basically aligned in longitudinal direction (X). Threaded rod 8 rotates and but cannot move back and forth.

Threaded rod 8 and the threaded opening of mobile item 9 has a thread of between 0.65 mm and 0.85 mm to block the movement of mobile bit 2a when it is in the closed position. Preferably, the thread is 0.75 mm.

For example, for a 10 mm movement of mobile bit 2a between the closed and open position, corresponding to a 10 mm transverse movement of mobile item 9 along threaded rod 8, the speed of the motor is 360 rotations per minute, and the thread of threaded rod 8 and the threaded opening of mobile item 9 is 0.75 mm. This configuration effectively blocks the movement of mobile bit 2a when it is in the closed position. Mobile item 9 may be a nut, for example.

In one variation, trigger mechanism 3 may include gear system (rack-and-pinion, conical wheels or cylinders), a bearing system (screw bearings), pulleys, belt, cog, chain, friction transmission or a scotch yoke/cam system.

Mobile bit 2a may be made of stainless steel, for example. Mobile bit 2a is extended by rectilinear arm 15 which forms a slide and extends to the interior of grip body 7. This arm 15 slides in housing 27 in grip body 7 between the closed and open position of mobile bit 2a. Second transmission mechanism 9 and, more specifically, mobile item 9 is part of this arm 15. In the examples in FIGS. 1 to 3, mobile item 9 is attached to arm 15.

Second transmission mechanism 9 includes stop 10 which comes into contact with counter stop 11 on grip body 7 to limit the opening of mobile bit 2a. In the example in FIGS. 1 to 3, stop 10 is located on mobile item 9 and consists of its forward lateral surface. Mobile item 9 is generally cylindrical in shape, its forward lateral surface then forms a ring. Similarly, counter stop 11 of grip body 7 is cylindrical in shape. Counter stop 11 is located near the front end of threaded rod 8 and surrounds it. The open position of mobile bit 2a is limited by the contact of counter stop 11 with stop 10. The closed position of mobile bit 2a is limited by the contact of mobile bit 2a with side wall 25 of cooking pot 24, which is itself in contact with fixed bit 2b.

In FIG. 3, arm 15 of mobile bit 2a extends basically to the middle of removable grip mechanism 1.

Removable grip mechanism 1 includes blocking mechanism 21 to block the attachment mechanism in the closed position. In this example, the attachment mechanism include two bits 2a and 2b. Blocking mechanism 21 blocks mobile bit 2a in the closed position. Blocking mechanism 21 prevents any movement away by mobile bit 2a when it is in the closed position due, for example, to a heavy load in the gripped cooking utensil. They make the removable grip mechanism 1 safer. Blocking mechanism 21 also increases the thread of threaded rod 8 and therefore, reduces the closing time of mobile bit 2a (or the rotation speed of the threaded rod) and increases the tightening coupling. The safety function is then provided by blocking mechanism 21 and no longer by threaded rod 8.

In one possible variation, blocking mechanism 21 is mounted to move in translation within grip body 7 along longitudinal direction (X) between a released and blocked position in which they immobilize mobile bit 2a in its closed position.

Blocking mechanism 21 includes pinching mechanism 13a and 13b and cage 14 in which pinching mechanism 13a and 13b is housed. Cage 14 surrounds mobile bit 2a. Two pinching bits 13a and 13b are both located on arm 15 of mobile bit 2a and are designed to immobilize mobile bit 2a by pinching it. Cage 14 is located near the extremity of arm 15 of mobile bit 2a. Pinching mechanism 13a and 13b may be cylinders mounted to rotate within cage 14. Cage 14 may be move along longitudinal direction (X) from the released position to the blocked position. Blocking mechanism 21 is triggered mechanically. Blocking mechanism 21 is triggered when the user pushes a button located on the grip body.

In accordance with another variation, blocking mechanism 21 is formed by electromechanical mechanism 5, 5a, 5b and 5c to block the attachment mechanism in the closed position.

In a possible implementation, removable grip mechanism 1 may include an attachment electromechanical mechanism powered by electrical energy source 6 and blocking mechanism 21 formed by an electromagnet powered by electrical energy source 6 (not shown). The electromagnet is located near the rear extremity of removable grip mechanism 1. It works with a metallic plate which is part of mobile bit 2a and, more specifically, which is attached to the extremity of arm 15. When mobile bit 2a is in the closed position, the electromagnet is activated to attract the plate to pin it against the electromagnet, thereby blocking mobile bit 2a in the closed position. The electromagnet may switch between a rest state in which mobile bit 2a is unblocked and an activated state in which the electromagnet blocks mobile bit 2a.

Figure 24:
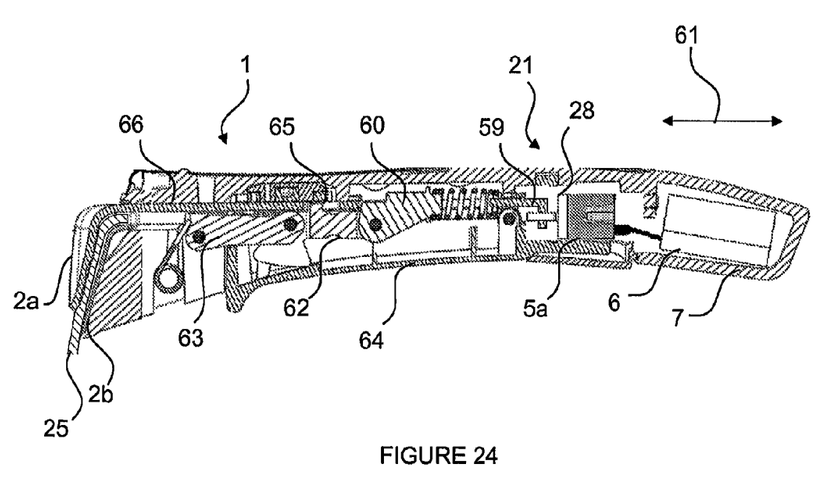
FIG. 24 shows a longitudinal cut-away of a removable grip mechanism with an electromagnet as a blocking mechanism.

In accordance with another variation shown in FIG. 24, blocking mechanism 21 is formed by an electromagnet powered by electrical energy source 6 and removable grip mechanism 1 includes a mechanical attachment mechanism such as those described in Claim EP-1991098, for example. Other mechanical attachment mechanisms may also be used.

To move mobile bit 2a relative to fixed bit 2b facing it, the user uses slide 60 mounted in translation on a longitudinal direction 61 relative to body 7, and initial and second pivoting connecting rods 62 and 63. The second connecting rod acts directly on mobile bit 2a. Maneuver button 64 mounted to shift on body 7 controls second connecting rod 63 and, through articulated chain 60, 62 and 63 via lug 65 passing through a gap in rod 66 which terminates with bit 2a. Additional details are available in EP 2007260.

The electromagnet is located near the rear extremity of removable grip mechanism 1. It works with metallic plate 28 which is part of mobile bit 2a. More specifically, metallic plate 28 is attached to arm 59, which is itself attached to slide 60. When mobile bit 2a is in the closed position, the electromagnet is activated to attract plate 28 to force it against the electromagnet, thereby blocking mobile bit 2a in the closed position. The electromagnet may shift between a rest state in which mobile bit 2a is unblocked and an activated state in which the electromagnet blocks mobile bit 2a.

In one variation, blocking mechanism 21 may include a pad or an irreversible wheel.

Figure 6:
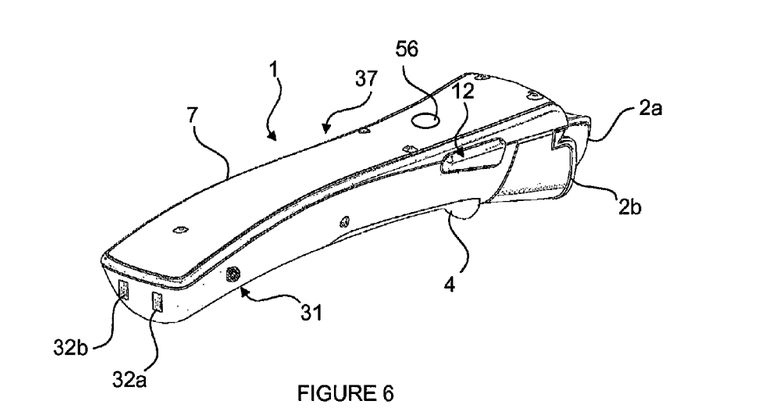
FIG. 6 shows a side view of a removable grip mechanism with contacts.

Command mechanism 4, 12, 22 and 56 includes command button 56, shown in FIG. 6, which is accessible from the exterior of grip body 7 and an electronic circuit (not shown) connected to command button 56 and electromechanical mechanism 5, 5a, 5b and 5c. In the examples in FIGS. 1 to 3, command button 56 is located beneath removable grip mechanism 1. When the user pushed command button 56, a signal is transmitted to the electronic circuit which controls the rotation of electrical motor 5.

Command mechanism 4, 12, 22 and 56 may include switch 12 which is accessible from the exterior of grip body 7 to manually select the rotation direction of electrical motor 5.

An initial rotation direction is assigned to open mobile bit 2a. A second, opposite rotation direction is assigned to close mobile bit 2a. For example, when the rotation direction to close mobile bit 2a is first selected with switch 12, pushing command button 56 causes electrical motor 5 to rotate in that rotation direction and close mobile bit 2a.

Figure 15:
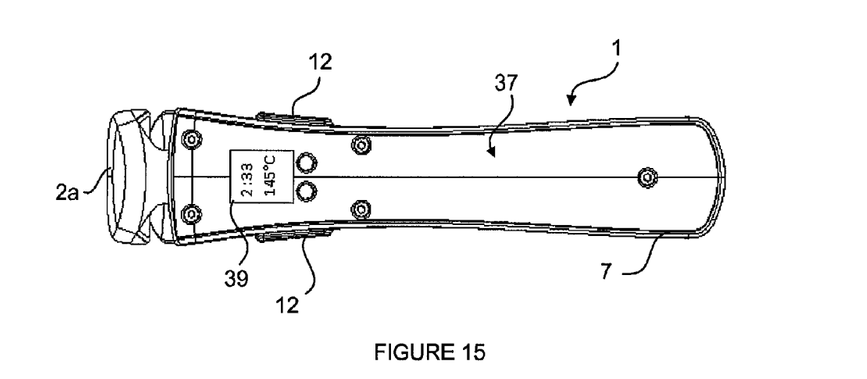
FIG. 15 shows a view from above of a removable grip mechanism with a display screen.

In the example in FIG. 15, command mechanism 4, 12, 22 and 56 includes two switches 12. Each switch 12 is located on one of the lateral walls of removable grip mechanism 1.

Figure 8:
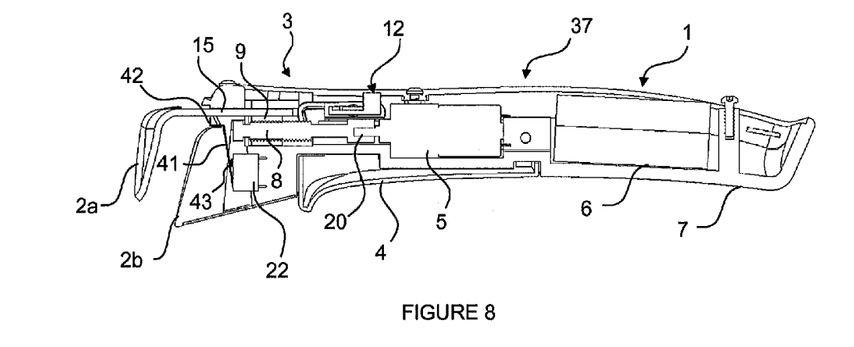
FIG. 8 shows a removable grip mechanism which includes a sensor to detect the installation of the grip mechanism on the cooking pot.
Figure 9:
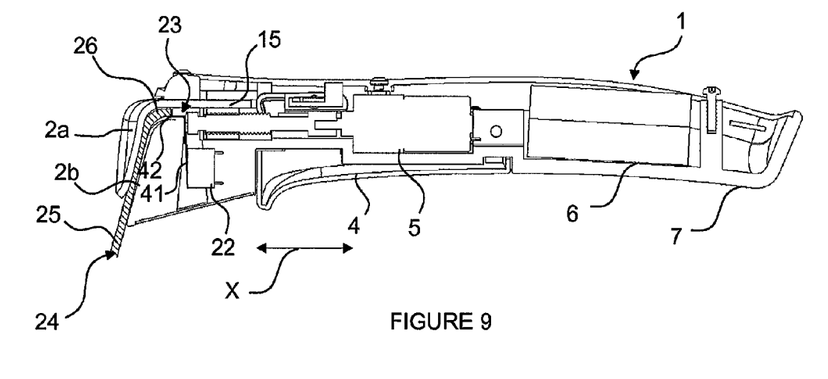
FIG. 9 shows the details of the positioning sensor.

In one variation, command mechanism 4, 12, 22 and 56 may include sensor 22 to detect the presence of removable grip mechanism 1 attached to or in the immediate proximity of cooking pot 24, as shown in FIGS. 8 and 9. Sensor 22 includes switch 22 connected to mobile arm 41. Arm 41 includes lug 42 on one of its extremities which moves in relation to slit 23 in grip body 7 between a deactivated position when removable grip mechanism 1 is not attached to cooking pot 24 (FIG. 8) and an activated position when removable grip mechanism 1 is attached to cooking pot 24 (FIG. 9). Lug 42 moves in translation basically in longitudinal direction (X). Slit 23 is located on the extension of curved section 19 of fixed bit 2b. When fixed bit 2b is in contact with side wall 25 of cooking pot 24, the extremity of curved edge 26 enters slit 23 by displacing lug 42 to the back of removable grip mechanism 1. This moves arm 41 to switch 22 which is supported by button 43 on switch 22. Switch 22 is then in its activated position and transmits a signal to the electrical circuit which then detects the attachment of removable grip mechanism 1 on cooking pot 24. When the user uses command mechanism 4, 12, 22 and 56, electrical motor 5 rotates in the rotation direction which closes mobile bit 2a.

In one variation, the activation of switch 22 automatically closes mobile bit 2a without user intervention.

Figure 14:
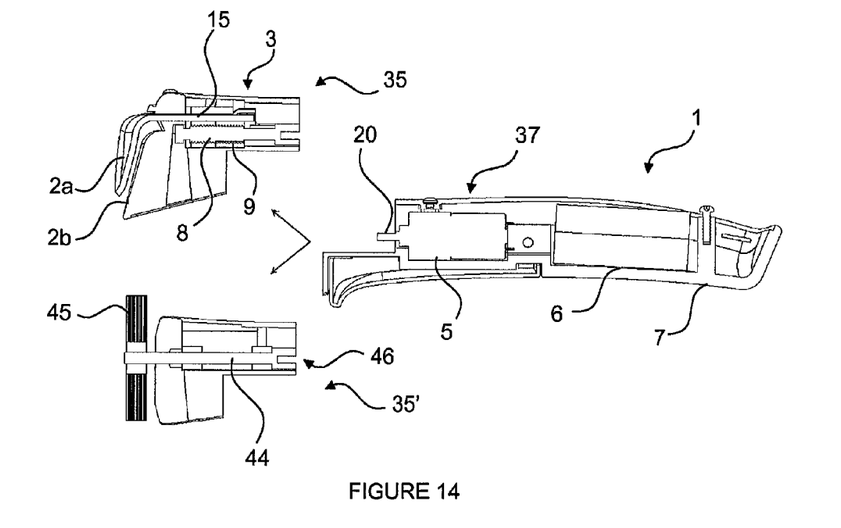
FIG. 14 shows a longitudinal cut-away of a removable grip mechanism including a removable module, in accordance with one implementation of the invention.

In another possible implementation, grip mechanism 1 includes removable module 35 which is separable from grip body 7, as shown in FIG. 14. Removable module 35 contains the mechanical mechanism and trigger mechanism 3. In this example, the mechanical mechanism includes the attachment mechanism which contains the bit which forms pincer 2a and 2b. Grip body 7 includes electrical motor 5 and energy source 6. Trigger mechanism 3 can be connected to and disconnected from electrical motor 5. More specifically, threaded rod 8 can be connected to and disconnected from shaft 20 of electrical motor 5. Threaded rod 8 includes housing 46 at its rear extremity which is designed to accept the shaft of electrical motor 5. Removable module 35 may be held within the front face of grip body 7. Removable module 35 can be easily connected to and disconnected from grip body 7. Accordingly, when removable module 35 includes bits which form pincer 2a and 2b is detached from grip body 7, it is possible to connect additional removable module 35' which includes a position other than pinching such as, for example, a cleaning position.

FIG. 14 shows an example of additional removable module 35' which includes a mechanical mechanism with rotating brush 45. One of the extremities of rotating brush 45 is connected to shaft 44. When additional removable module 35' is enclosed within grip body 7, housing 46 on shaft 44 of additional removable module 35' receives shaft 20 of electrical motor 5. In this manner, rotating brush 45 may be driven by electrical motor 5.

In one variation, the brush may be replaced by an agitator to blend, crush or mix food.

Therefore, the mobility of modules 35 and 35' allows grip mechanism 1 to provide additional functions such as cleaning the cooking pots or blending, mixing, or grinding food, for example. In accordance with another implementation shown in FIGS. 4 and 5, electromechanical mechanism 5, 5a, 5b and 5c includes electromagnet 5a. Electromagnet 5a may shift between a rest state in which the pincer is in the open position and an activated state in which it holds the pincer in the closed position.

Figure 4:
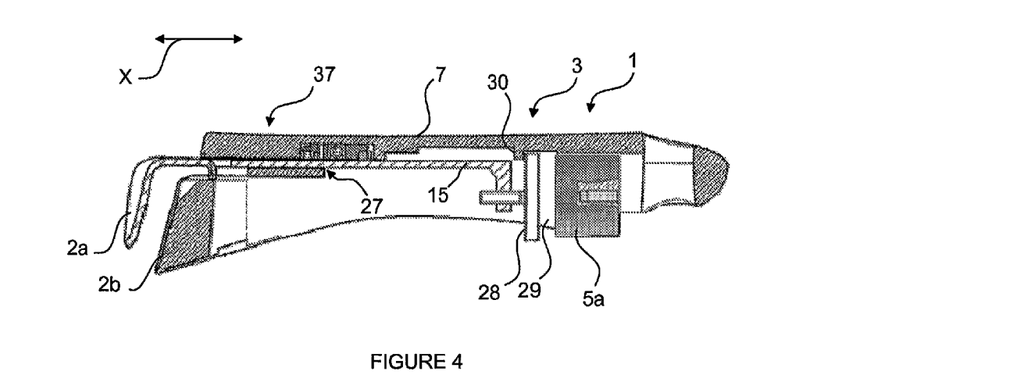
FIG. 4 shows a longitudinal cut-away of a removable grip mechanism which includes an electromagnet in the open position, in accordance with another implementation of the invention.
Figure 5:
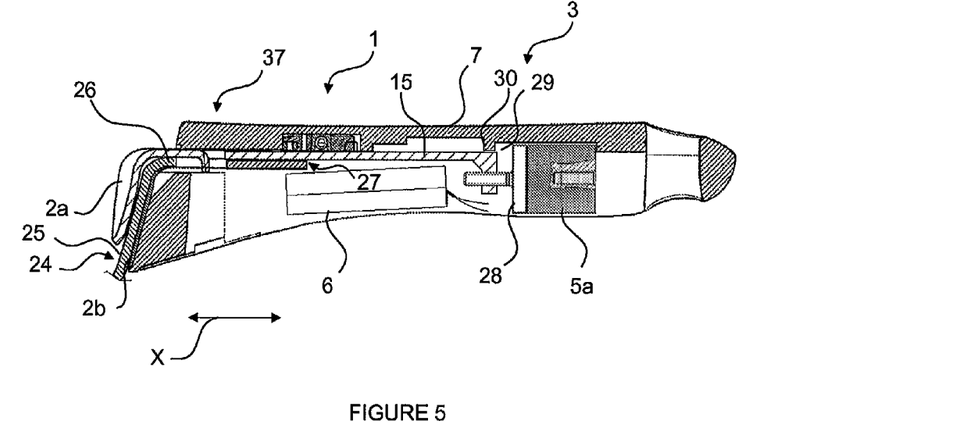
FIG. 5 shows a longitudinal cut-away of the removable grip mechanism in accordance with this other implementation in the closed position.

As in the implementation prior, mobile bit 2a is extended by arm 15 sliding in slide 27 in grip body 7. Arm 15 extends along longitudinal direction (X) and includes metallic plate 28 on its extremity opposite mobile bit 2a. Metallic plate 28 extends in a plane that is basically perpendicular to longitudinal direction (X). Metallic plate 28 may be made of a ferromagnetic material. It moves in translation along longitudinal direction (X) in housing 29, which is partly limited by electromagnet 5a and stop 30. The width of the housing 29 corresponds to the movement distance of mobile bit 2a relative to fixed bit 2b.

When mobile bit 2a is in the open position (FIG. 4) and the user pushes on the command mechanism, electromagnet 5a is activated to attract metallic plate 28 to pin it against the electromagnet. Mobile bit 2a is then in the closed position (FIG. 5).

Inversely, if the user pushes on the command mechanism when mobile bit 2a is in the open position, electromagnet 5a is deactivated. The electromagnetic field is cut and no further attraction force is exerted on metallic plate 28. Mobile bit 2a may then be freely moved along longitudinal direction (X) in housing 29. Mobile bit 2a may be opened by moving removable grip mechanism 1 slightly in longitudinal direction (X) and in a direction opposite cooking pot 24.

As in the prior implementation, trigger mechanism 3, electrical energy source 6 and the command mechanism (not shown) are housed in grip body 7.

Figure 10:
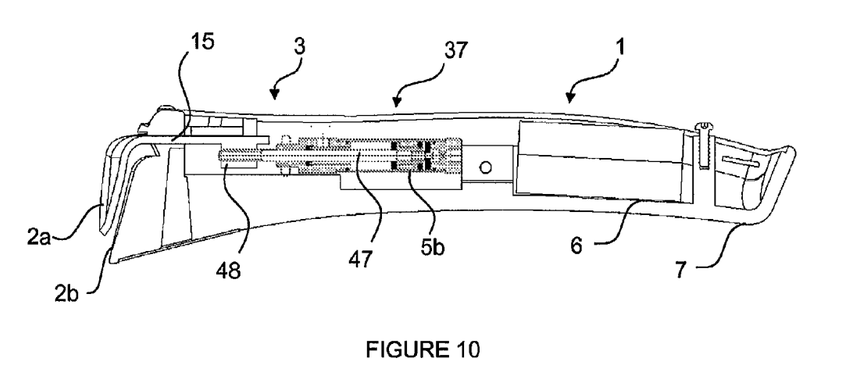
FIG. 10 shows a longitudinal cut-away of a removable grip mechanism including a jack in accordance with another implementation of the invention.

In another possible implementation shown in FIG. 10, electromechanical mechanism 5, 5a, 5b and 5c includes electrical jack 5b with mobile piston 47 between a retracted state in which the pincer is in the closed position (FIG. 10) and a deployed state in which the pincer is in the open position. Piston 47 is connected to arm 15 of mobile bit 2a via connection part 48. Arm 15 and connection part 48 form trigger mechanism 3. Piston 47 moves in translation in direction (X).

Figure 11:
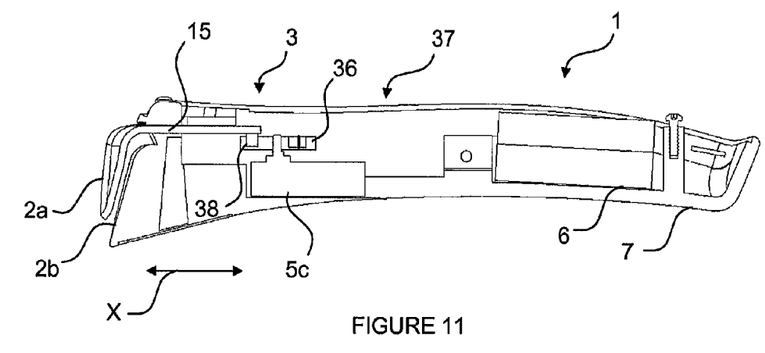
FIG. 11 shows a longitudinal cut-away of a removable grip mechanism with a servomotor in accordance with another implementation of the invention.
Figure 12:
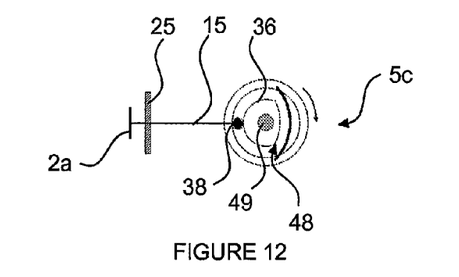
FIG. 12 shows a diagram from above of the servomotor and the mobile bit in the open position.
Figure 13:
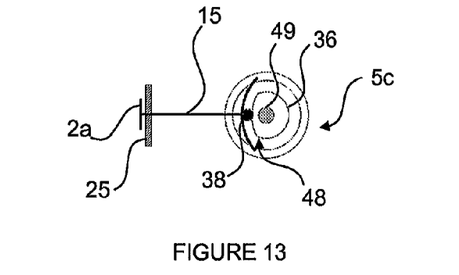
FIG. 13 shows a diagram from above of the servomotor and the mobile bit in the closed position.

In another possible implementation shown in FIG. 11, electromechanical mechanism 5, 5a, 5b and 5c includes servomotor 5c which rotates eccentric item 36. The rotation of eccentric item 36 around axis 49 results in the transverse movement along longitudinal direction (X) of plate 38 which is part of mobile bit 2a and, more specifically, which is part of arm 15 of mobile bit 2a. Eccentric item 36, plate 38 and arm 15 form trigger mechanism 3. Eccentric item 36 includes slit 48 to accept plate 38. Eccentric item 36 rotates between an open position of mobile bit 2a (FIG. 12) in which plate 38 is engaged in slit 48 and a closed position of mobile bit 2a (FIG. 13) in which plate 38 is engaged in slit 48. Slit 48 is forms an arc. When plate 38 is engaged in slit 48, mobile bit 2a and arm 15 move in translation toward servomotor 5c. Mobile bit 2a is attracted toward fixed bit 2b.

Electrical energy source 6 may include a rechargeable electrical energy source (large battery or super capacitor) or one or more batteries. For example, a large battery may provide 3.6 Volts and capacity of 780 milliamp*hrs. The electrical energy may be recovered by induction by an induction plate using a conducting item located on the bottom of cooking pot 24.

If a rechargeable electrical energy source is used, removable grip mechanism 1 includes electromagnetic connection mechanism to recharge the rechargeable electrical energy source. "Electromagnetic connection mechanism" means any mechanism, whether electrical or magnetic.

The electromagnetic connection mechanism may include "jack" type female socket 31 as shown in FIG. 6. This female socket 31 is located on grip body 7 of removable grip mechanism 1. It may be located on the side wall of grip body 7. Female socket 31 can be connected to an energy source using, for example, a power cord with male "jack" type plug designed to be inserted into female socket 31 of removable grip mechanism 1.

The electromagnetic connection mechanism may include two electrical connection terminals 32a and 32b connected to the rechargeable electrical energy source, as shown in FIG. 6. Removable grip mechanism 1 of FIG. 6 includes electrical connection terminals 32a and 32b in addition to female socket 31. Electrical connection terminals 32a and 32b can be connected to and disconnected from two electrical connection terminals on a recharging stand to recharge the electrical energy source 6. Electrical connection terminals 32a and 32b are located on the back of removable grip mechanism 1. Electrical connection terminals 32a and 32b may be connection plates or contacts. Removable grip mechanism 1 may be placed on a recharging base in a basically vertical position or inclined to the vertical when the recharging stand is placed on a horizontal surface. Recharging stand is connected to the electrical grid (230 V for example).

Figure 7:
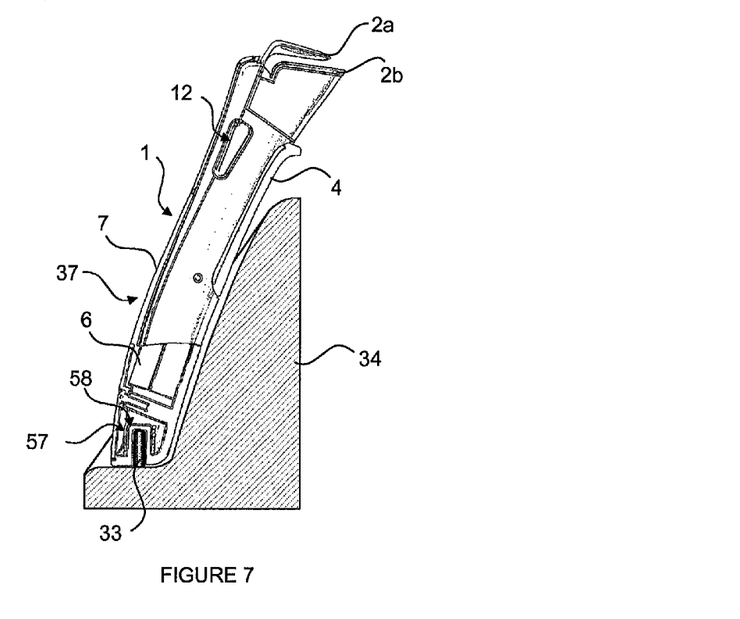
FIG. 7 shows the removable grip mechanism with a secondary induction coil recharging on a recharging stand with a primary induction coil.

In one variation, the electromagnetic connection mechanism may include secondary induction coil 57 connected to the rechargeable electrical energy source, as shown in FIG. 7. Secondary induction coil 57 surrounds cavity 58 in grip body 7 in which primary induction coil 33 on recharging stand 34 can be inserted when the handle is in the recharge position. This improves the watertightness of removable grip mechanism 1.

In accordance with one possible implementation, the mechanical mechanism may include mechanisms other than the attachment mechanism. It may include a rotating brush connected to a shaft driven by the electromechanical mechanism or an agitator to blend, crush or mix the food, for example. In this implementation, removable grip mechanism 1 includes an attachment mechanism which may be triggered manually or electromechanically.

In one possible implementation (not shown), the electromechanical mechanism may include a cam rotated by threaded rod 8. The cam is part of threaded rod 8 and is located near the front end of threaded rod 8. The cam is housed in a housing in grip body 7. The housing opens to the exterior on the upper face of grip body 7. The cam is rotated by electrical motor 5 to move between a rest position in which the cam is housed within the housing and an activated position in which the cam protrudes from the upper face of removable grip mechanism 1. In the rest position, the main axis of the cam is basically parallel to the horizontal plane of removable grip mechanism 1. In the activated position, the main axis of the cam is basically perpendicular to the horizontal plane of removable grip mechanism 1 and oriented upward when removable grip mechanism 1 is attached to cooking pot 24 when placed on a horizontal surface. In this activated position, the cam protrudes from the upper face of removable grip mechanism 1 and allows the edge of a cover placed on cooking pot 24 to be raised to a greater or lesser degree to control the rate of vapor flow when food is heated in cooking pot 24.

In one variation, the electromechanical mechanism may include a cog rotated by threaded rod 8 which is itself driven by electrical motor 5 (not shown). The cog is part of threaded rod 8 and is located near the front end of threaded rod 8. The cog is housed in a housing in grip body 7. The housing opens to the exterior on the upper face of grip body 7. The cog is rotated by electrical motor 5 to drive a trammel located on the cover. The trammel rotates a paddle to blend the food (for example, purée, fried vegetables, or soup) located on the bottom of cooking pot 24.

Figures 17, 18:
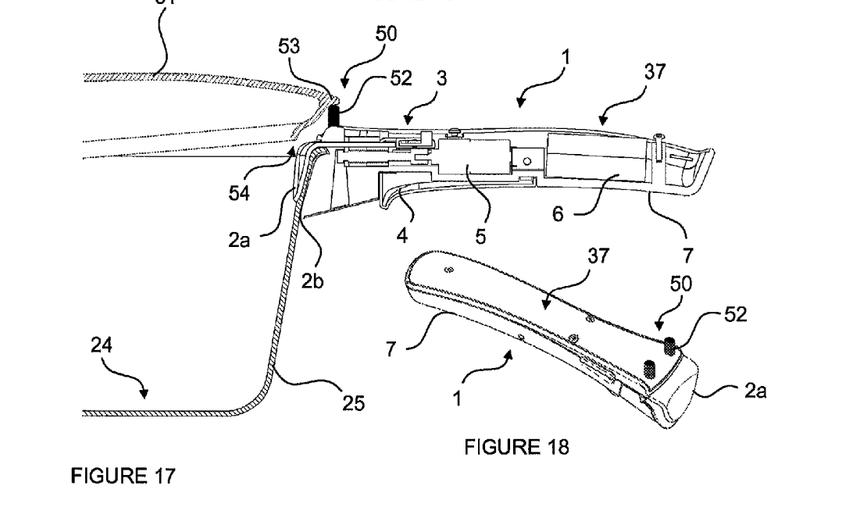
FIG. 17 shows a longitudinal cut-away of a removable grip mechanism set on a pot which includes a mechanism to lift a cover, in the raised position.
FIG. 18 shows a perspective view of this removable grip mechanism with the lifting mechanism in the raised position.
Figures 19, 20:
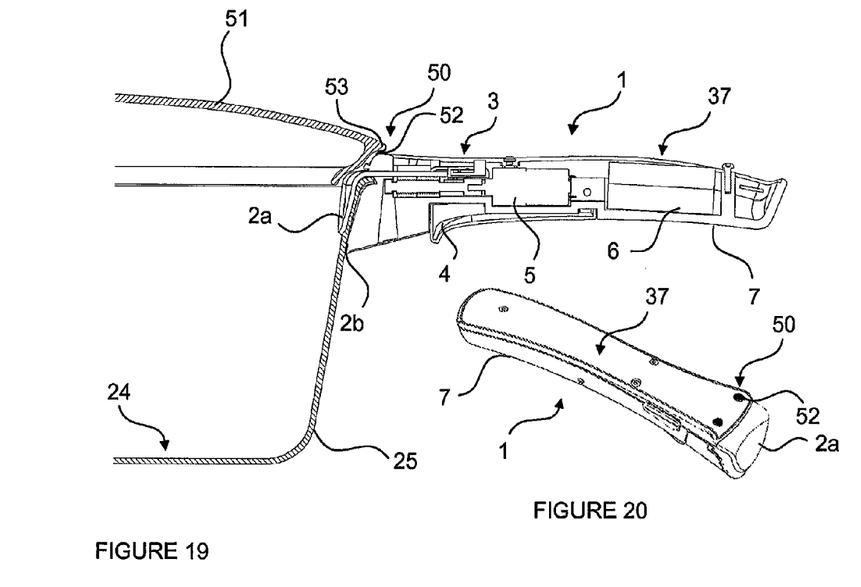
FIG. 19 shows a longitudinal cut-away of a removable grip mechanism set on a pot which includes a lifting mechanism in the rest position.
FIG. 20 shows a perspective view of this removable grip mechanism with the lifting mechanism in the rest position.

In one variation shown in FIG. 17, removable grip mechanism 1 may include lifting mechanism 50 to lift cover 51 placed on pot 24. FIG. 17 shows a longitudinal cut-away of removable grip mechanism 1 set on pot 24 which includes lifting mechanism 50 in the raised position. FIG. 19 shows a longitudinal cut-away of removable grip mechanism 1 set on pot 24. Lifting mechanism 50 is shown in the rest position.

Lifting mechanism 50 includes two pistons 52 triggered by a motor and a trigger mechanism (not shown). This motor and electromechanical mechanism 5, 5a, 5b and 5c trigger bit 2a and 2b and are powered by energy source 6. Pistons 52 move in translation perpendicularly in longitudinal direction (X) between a rest position (FIGS. 19 and 20) in which they are retracted (completely or nearly so) in grip body 7 and a raised position (FIGS. 17 and 18) in which they protrude on upper face 37 of grip body 7 and are basically perpendicularly thereto.

Pistons 52 are positioned near bit 2a and 2b and are aligned along the forward edge of the grip mechanism in a direction perpendicular to longitudinal direction (X).

Grip mechanism 1 pinches side wall 25 of pot 24 from above the wall. As shown in FIG. 19, when pistons 52 are in a rest position (retracted), cover 51 is designed to rest on the pistons and cover mobile bit 2a to allow as little space possible between the cover and grip mechanism 1. Cover 51 includes support edge 53 on its external periphery which supports pistons 52.

When pistons 52 are in the raised position (FIGS. 17, 18), they are in contact with support edge 53 of cover 51 and push it upward to form space 54 between cover 51 and mobile bit 2a of grip mechanism 1. A space is thereby formed between cover 51 and the upper edge of pot 24 to allow vapor to pass.

In one variation, the mechanical mechanism includes lifting mechanism 50. Lifting mechanism 50 is triggered by trigger mechanism 3, which is itself driven by electromechanical mechanism 5, 5a, 5b and 5c (not shown). The attachment mechanism is triggered manually.

Figure 21:
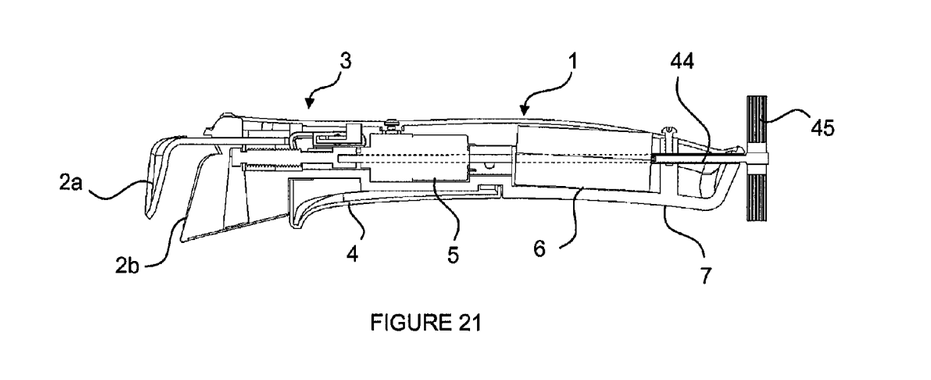
FIG. 21 shows a longitudinal cut-away view of a removable grip mechanism with a cleaning brush.

In the implementation shown in FIG. 21, the mechanical mechanism may include brush 45 with shaft 44 rotated by motor 5. Motor 5 triggers both brush 45 and trigger mechanism 3, which moves bit 2a of the attachment mechanism. Brush 45 may clean cooking pots such as pot 24, for example. Removable grip mechanism 1 then forms a multifunctional handle which eliminates the need for other utensils.

In one variation, removable grip mechanism 1 may include two electrical connection terminals connected to electrical energy source 6 to power an electrical mechanism external to removable grip mechanism 1 (not shown). The two connection terminals are located on front face of removable grip mechanism 1 and are designed to be connected to two other connection terminals on the cooking pot. The external electrical mechanism can be an electrical resistor located under the cooking pot to heat it or an agitator located on the cover, for example.

Removable grip mechanism 1 may include display 39 powered by electrical energy source 6 and be connected to the electronic circuit, as shown in FIG. 15. This display 39 may include a liquid crystal screen for example, to, inter alia, display remaining power in electrical energy source 6, the time, remaining cooking time or temperature of the cooking pot. Liquid crystal screen is located on upper face 37 of removable grip mechanism 1.

Removable grip mechanism 1 may include a measurement mechanism such as a temperature sensor or a mechanism to determine the weight of the food in cooking pot 24, for example. The temperature or weight may be displayed on the liquid crystal screen. Removable grip mechanism 1 may include a clock and timer. The measurement mechanism is powered by electrical energy source 6 and is connected to the electronic circuit.

Removable grip mechanism 1 may include a wireless communication mechanism to receive and/or transmit information to a base station. The communication mechanism may include a radio transmitter and/or receiver powered by electrical energy source 6 which is connected to the electronic circuit. For example, the base station may transmit cooking recipes to removable grip mechanism 1. These recipes are displayed on the liquid crystal screen. Removable grip mechanism 1 may transmit signals with the temperature of the cooking pot to the base station.

Figure 16:
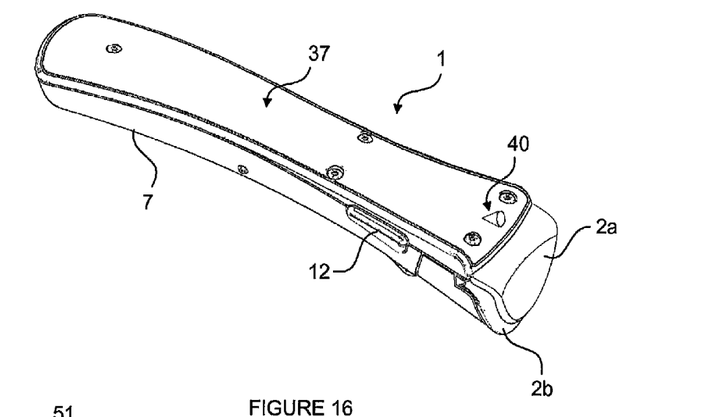
FIG. 16 shows a view from above of a removable grip mechanism with a diode.

Removable grip mechanism 1 may include lighting mechanism 40, for example, a diode, to light the food in cooking pot 24. Lighting mechanism 40 is located on upper face 37 and in front of removable grip mechanism 1. Lighting mechanism 40 is powered by electrical energy source 6.

The electronic card or circuit may, for example, control the rotation direction of the motor, detect the tightening of mobile bit 2a, display information on the status of removable grip mechanism 1 (open/closed, remaining power, specific problems, etc.), and the battery charge.

In one possible operation mode, prior to using the cooking pot or cooking pot, the user attaches the handle or removable grip mechanism 1 which is in the open position to side wall 25 of cooking pot 24.

When the user pushes command button 56, electrical motor 5 starts, turning threaded rod 8. Mobile item or nut 9 moves and drives mobile bit 2a or a fork. When mobile bit 2a comes into contact with the cap, electrical motor 5 stops, as a surge in motor power is detected and transmitted to the electronic circuit.

When the cooking pot is used when removable grip mechanism 1 is grasped by the user, blocking mechanism 21 (mechanical safety) prevents mobile bit 2a from being triggered, and therefore its accidental opening when moving cooking pot 24, for example.

After the cooking pot is used, by pushing command button 56, electrical motor 5 is restarted, opening mobile bit 2a. The electronic circuit "learns" the status of the handle which is in the closed position in this case and controls the rotation direction of electrical motor 5 to activate the rotation direction which opens the handle. In one variation, the user may manually select the rotation direction of electrical motor 5 using switch 12.

If energy source 6 is a battery, recharging stand 34 recharges the handle after use.

In one variation, at rest, removable grip mechanism 1 is held in the closed position by a recall spring, for example. Command button 56 is then only used to open mobile bit 2a. When command button 56 is released, mobile bit 2a is automatically closed by the spring.

Figure 22:
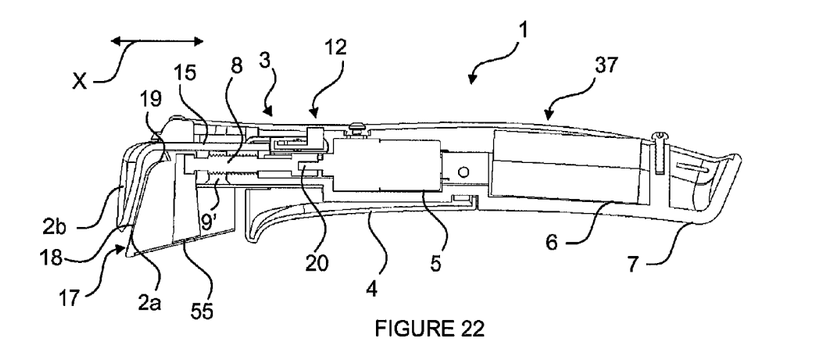
FIG. 22 shows a longitudinal cut-away of a removable grip mechanism in which the mobile bit is formed by a mobile forward section of the grip body, with said mobile bit in the closed position.
Figure 23:
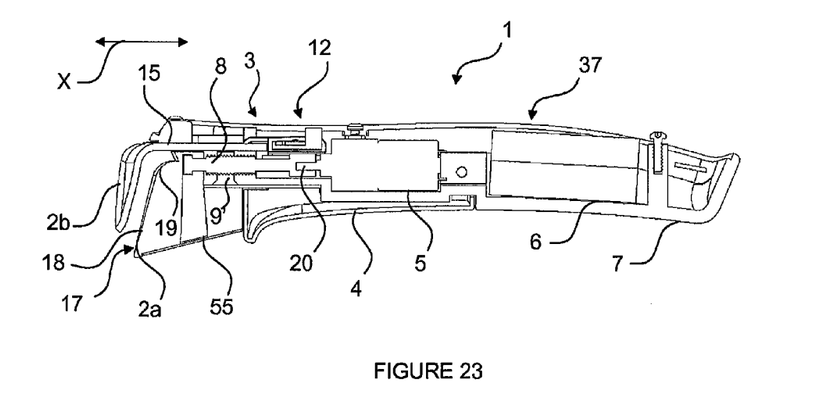
FIG. 23 shoes a longitudinal cut-away of a removable grip mechanism in which the mobile bit is in the open position.

In one possible implementation shown in FIGS. 22 and 23, grip body 7 includes mobile forward section 55 which forms mobile bit 2a. This mobile forward section 55 includes front contact surface 17 designed to come into contact with the external surface of side wall 25 of pot 24. Fixed bit 2b is extended by arm 15 which is part of grip body 7. Fixed bit 2b includes an internal contact surface designed to come into contact with the internal surface of side wall 25 of pot 24. Mobile forward section 55 moves in translation along longitudinal direction (X) between a closed position (FIG. 22) in which bit 2a and 2b may pinch side wall 25 of pot 24 and an open position (FIG. 23). Mobile forward section 55 moves between fixed bit 2b and the remainder of grip body 7.

Mobile forward section 55 is activated by trigger mechanism 3. Trigger mechanism 3 includes threaded rod 8 which is rotated by electrical motor 5, and mobile item 9' which is part of mobile forward section 55 (mobile bit 2a) and has a threaded opening in which engages threaded rod 8. The rotation of threaded rod 8 moves mobile item 9' along it and moves mobile forward section 55 in translation. Electrical motor 5 is powered by electrical energy source 6. Command mechanism 4, 12, 22 and 56 is designed to control the operation of and stop motor 5. Removable grip mechanism 1 shown in the example in FIGS. 22 and 23 may have the characteristics described above for removable grip mechanism 1 of the example in FIGS. 1 and 2. This removable grip mechanism 1 has fewer mechanical elements, can be released above trigger mechanism 3 and is less fragile than removable grip mechanism 1 which includes mobile bit 2a at its front extremity. Mobile forward section 55 is protected by fixed bit 2b.

In one variation, command mechanism 4, 12, 22 and 56 includes additional security mechanism 4 which prevents the attachment mechanism from being triggered when grip mechanism 1 is grasped. Additional security mechanism 4 includes button 4 which is advantageously located under grip body 7. When the user grasps the handle, he automatically triggers additional security mechanism 4, which prevents the attachment mechanism from being triggered. Button 4 may be connected to a switch which cuts the electrical power. Additional security mechanism 4 is a dead man's switch.

The invention claimed is:

1. Removable grip mechanism (1) for cooking pot (24), wherein said removable grip mechanism (1) includes grip body (7), and attachment mechanism to cooking pot (24) which can be connected to and disconnected from the cooking pot (24), and electrical energy source (6), the removable grip mechanism (1) further comprises:
    electromechanical mechanism (5, 5a, 5b, and 5c) powered by the energy source (6) and configured to actuate a mechanical mechanism, thereby causing at least a portion of the mechanical mechanism to move, and
    command mechanism (4, 12, 22 and 56) to control the operation of and stopping of the electromechanical mechanism (5, 5a, 5b and 5c).

2. Removable grip mechanism (1) in accordance with claim 1, in which the mechanical mechanism includes said attachment mechanism.

3. Removable grip mechanism (1) in accordance with claim 1, which includes blocking mechanism (21) to block said attachment mechanism in the closed position.

4. Removable grip mechanism (1) in accordance with claim 3, in which the blocking mechanism (21) is formed by said electromechanical mechanism (5, 5a, 5b and 5c) to block said attachment mechanism in the closed position.

5. Removable grip mechanism (1) in accordance with claim 2, in which the attachment mechanism include two bits (2a and 2b) which form a pincer at least one bit (2a) of which moves relative to the grip body (7) and is triggered by the electromechanical mechanism (5, 5a, 5b and 5c).

6. Removable grip mechanism (1) in accordance with claim 1, which includes removable module (35) which can be separated from the grip body (7) and contains the mechanical mechanism, while the grip body (7) includes the electromechanical mechanism (5, 5a, 5b and 5c) and the energy source (6).

7. Removable grip mechanism (1) in accordance with claim 1, in which the electromechanical mechanism (5, 5a, 5b and 5c) includes electrical motor (5).

8. Removable grip mechanism (1) in accordance with claim 2, in which said removable grip mechanism (1) includes trigger mechanism (3) driven by the electromechanical mechanism (5, 5a, 5b and 5c) and is designed to trigger said attachment mechanism.

9. Removable grip mechanism (1) in accordance with claim 8, in which the trigger mechanism (3) includes threaded rod (8) which is rotated by electrical motor (5), and mobile item (9), which is part of mobile bit (2a) having a threaded opening which engages the threaded rod (8), the rotation of which moves the mobile item (9) along the threaded rod (8) and moves the mobile bit (2a) in translation.

10. Removable grip mechanism (1) in accordance with claim 9, in which the threaded rod (8) and the threaded opening of the mobile item (9) have a thread of between 0.65 mm and 0.85 mm.

11. Removable grip mechanism (1) in accordance with claim 4, in which the blocking mechanism (21) includes an electromagnet that shifts between a rest state in which mobile bit (2a) is unblocked and an activated state in which the electromagnet blocks the mobile bit (2a).

12. Removable grip mechanism (1) in accordance with claim 3, in which the blocking mechanism (21) includes two pinching bits (13a and 13b) mobile in cage (14), wherein the two pinching bits (13a and 13b) are both located on arm (15) which extends perpendicular to mobile bit (2a), and the cage (14) moves along the arm (15) of the mobile bit (2a) between a released position and a blockage position in which the blocking mechanism (21) immobilizes the mobile bit (2a) in the closed position.

13. Removable grip mechanism (1) in accordance with claim 2, in which the electromechanical mechanism (5, 5a, 5b and 5c) includes electromagnet (5a) which shifts between a rest state in which a pincer is in the open position and an activated state in which the electromagnet (5a) holds the pincer in the closed position.

14. Removable grip mechanism (1) in accordance with claim 2, in which the electromechanical mechanism (5, 5a, 5b and 5c) includes electrical jack (5b) containing piston (47) connected to one of two bits (2a and 2b) which forms a pincer and moves between a retracted state in which the pincer is in the closed position and a deployed state in which the pincer is in the open position.

15. Removable grip mechanism (1) in accordance with claim 2, in which the electromechanical mechanism (5, 5a, 5b and 5c) includes servomotor (5c) which rotates eccentric item (36), which results in the movement of one of two bits (2a and 2b) which form a pincer.

16. Removable grip mechanism (1) in accordance with claim 1, in which the command mechanism (4, 12, 22 and 56) includes sensor (22) to detect the presence of the removable grip mechanism (1) against or in the immediate proximity of the cooking pot (24).

17. Removable grip mechanism (1) in accordance with claim 1, which includes an electromagnetic connection mechanism connected to the electrical energy source (6) to power an electrical mechanism external to the removable grip mechanism (1) or to recharge said electrical energy source (6) using a power source external to the removable grip mechanism (1).

18. Removable grip mechanism (1) in accordance with claim 17, in which the electromagnetic connection mechanism includes secondary induction coil (57) surrounding cavity (58) in the grip body (7) in which primary induction coil (33) on recharging stand (34) is inserted.

19. Removable grip mechanism (1) in accordance with claim 1, wherein the grip mechanism includes a measurement mechanism with a specific configuration, data display (39), a mechanism to illuminate the pot (40) and/or a wireless communication mechanism powered by the electrical energy source (6).

* * * * *